United States Patent
Li

(10) Patent No.: US 6,621,248 B1
(45) Date of Patent: Sep. 16, 2003

(54) CHARGING DEVICE WITH SELECTABLE OUTPUT VOLTAGE VALUES

(75) Inventor: Hsiu-Yu Li, Taipei Hsien (TW)

(73) Assignee: Advanced-Connectek Inc., Taipei (TW)

( * ) Notice: Subject to any disclaimer, the term of this patent is extended or adjusted under 35 U.S.C. 154(b) by 0 days.

(21) Appl. No.: 10/096,254

(22) Filed: Mar. 13, 2002

(51) Int. Cl.⁷ .................................................. H02J 7/00
(52) U.S. Cl. ...................................................... 320/125
(58) Field of Search ................................. 320/125, 136, 320/137, 138, 149, 152, 158, 165; 340/636; 361/78, 79, 86, 87, 90, 91.1, 101, 98

(56) References Cited

U.S. PATENT DOCUMENTS

| | | | | |
|---|---|---|---|---|
| 5,352,966 A | * | 10/1994 | Irons | 320/116 |
| 5,808,446 A | * | 9/1998 | Eguchi | 320/134 |
| 5,969,507 A | * | 10/1999 | Meyer | 320/137 |
| 6,172,892 B1 | * | 1/2001 | Plichta et al. | 320/136 |
| 6,184,659 B1 | * | 2/2001 | Darmawaskita | 320/139 |
| 6,377,029 B1 | * | 4/2002 | Krieger et al. | 320/139 |

* cited by examiner

*Primary Examiner*—Edward H. Tso
*Assistant Examiner*—Pia Tibbits
(74) *Attorney, Agent, or Firm*—Troxell Law Office PLLC

(57) ABSTRACT

A charging device having a voltage stabilization unit, a charging unit, a battery protection unit, and a voltage setting unit. The voltage setting unit includes a control circuit, a voltage adjustment circuit, and a voltage selection circuit. The charging device can output a selected one of a plurality of voltages to one of various portable electronic devices such that a plurality of portable electronic devices can be charged with only one charging device. Moreover, the device is connectable to external power source or automobile power supply depending on applications. Hence, it is convenient in use.

6 Claims, 5 Drawing Sheets

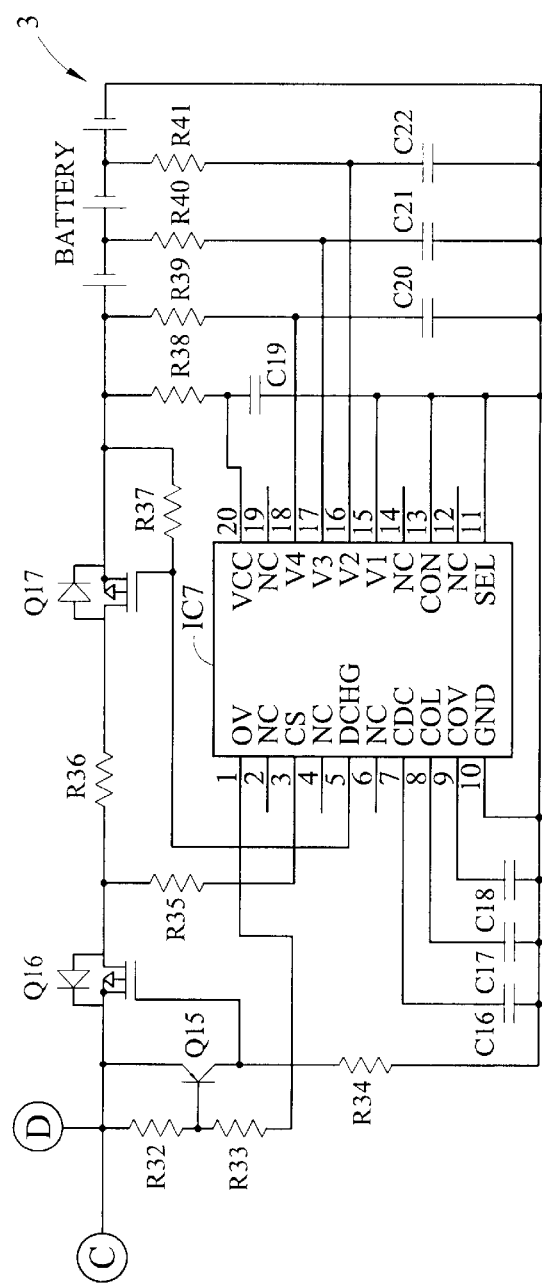
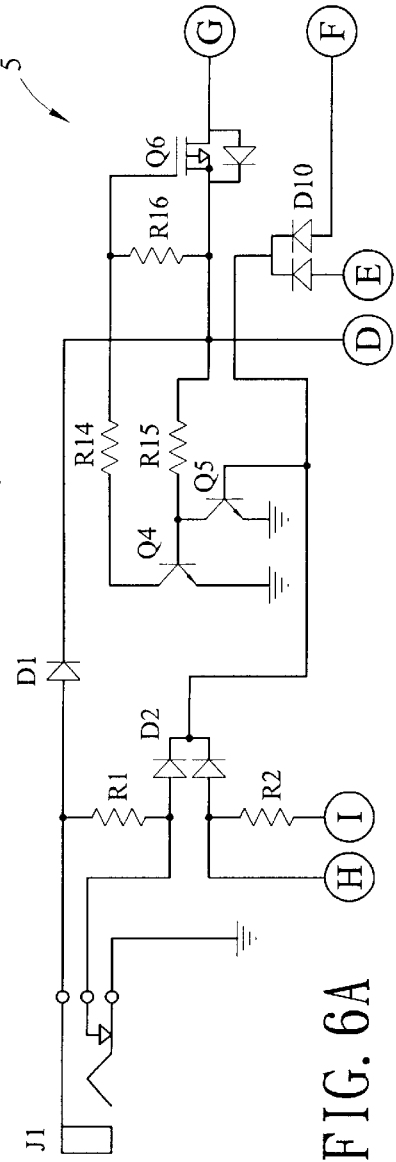
FIG. 5
FIG. 6A

US 6,621,248 B1

CHARGING DEVICE WITH SELECTABLE OUTPUT VOLTAGE VALUES

BACKGROUND OF THE INVENTION

1. Field of the Invention

The present invention relates to charging devices and more particularly to a charging device capable of outputting a selected one of a plurality of voltages to one of various portable electronic devices being connected.

2. Description of Related Art

Many current portable electronic devices such as mobile phones, digital cameras, notebook computers, camcoders, Walkmans, personal digital assistants (PDAs), or even some toys are powered by one or more batteries. The batteries could be rechargeable ones that can be recharged by a charging device. Conventionally, an output voltage value of charging device is fixed after being manufactured. In a charging operation, a consumed battery of the electronic device is placed in a charger. Next, alternating current from an external source is rectified into a direct current having a fixed voltage value by a rectification circuit of the charger prior to charging the battery. It is understood that different portable electronic devices may have different operating voltages. Moreover, the same electronic devices (e.g, mobile phones) made by different manufacturers may have different operating voltages. It is often that each portable electronic device has its own charger. Thus, it is possible that a person having, for example, 10 such portable electronic devices may also have 10 chargers since output voltage values of all 10 chargers are different each other. So many chargers may cause confusion to users while using. Further, precious storage space is occupied by the chargers, resulting in a messy storage space. Furthermore, to maintain the chargers is a waste of time and money.

Thus, it is desirable to provide a novel charging device with selectable output voltage values in order to overcome the above drawbacks of prior art.

SUMMARY OF THE INVENTION

It is an object of the present invention to provide a charging device capable of outputting a selected one of a plurality of voltages to one of various portable electronic devices being connected. By utilizing this, advantages such as adaptability by possessing only one charging device, convenience, and space saving are obtained.

It is another object of the present invention to provide a charging device being connectable to either external power source or automobile power supply depending on applications. Hence, it is convenient in use.

To achieve the above and other objects, the present invention provides a charging device comprising a voltage stabilization unit for maintaining a stable voltage output as receiving a rectified direct current (DC) voltage from an output of an adaptor; a charging unit coupled to an output of the voltage stabilization unit so as to control an on-off of the device and detect a charge level of a rechargeable battery being charged; a battery protection unit coupled to both an output of the charging unit and the battery so as to cut off the charging unit when an either over charging or over discharging of the battery occurs; and a voltage setting unit coupled to an output of the battery protection unit and including a switch being operative to select one of a plurality of output voltages of the battery protection unit.

The above and other objects, features and advantages of the present invention will become apparent from the following detailed description taken with the accompanying drawings.

BRIEF DESCRIPTION OF THE DRAWINGS

FIG. 5 is a circuit diagram of battery protection unit of the FIG. 1 device;

FIG. 6A is a circuit diagram of a voltage stabilization and protection circuit of another preferred embodiment of charging device according to the invention adapted to automobile power supply application.

DETAILED DESCRIPTION OF THE PREFERRED EMBODIMENTS

Figure 1:
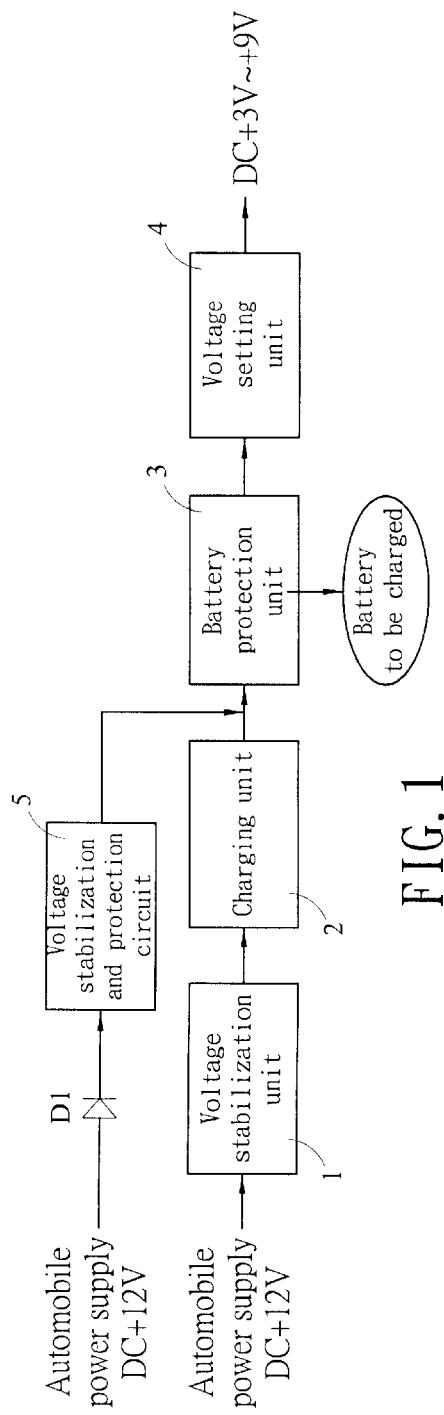
FIG. 1 is a block diagram of a charging device according to the invention.

Referring to FIG. 1, there is shown a block diagram of a charging device constructed in accordance with the invention. The device comprises a voltage stabilization unit 1, a charging unit 2, a battery protection unit 3, and a voltage setting unit 4. Voltage stabilization unit 1 acts to maintain a stable voltage output for driving charging unit 2 as receiving a rectified direct current (DC) voltage ranged from about +15V to +16V from an adaptor (not shown). Both charging unit 2 and battery protection unit 3 act to charge a consumed rechargeable battery (hereinafter called battery). An output voltage of voltage setting unit 4 can be adjusted by user for being adapted to various electrical devices. The device also includes an additional voltage stabilization and protection circuit 5 connectable to automobile power supply for charging therefrom.

Figure 2:
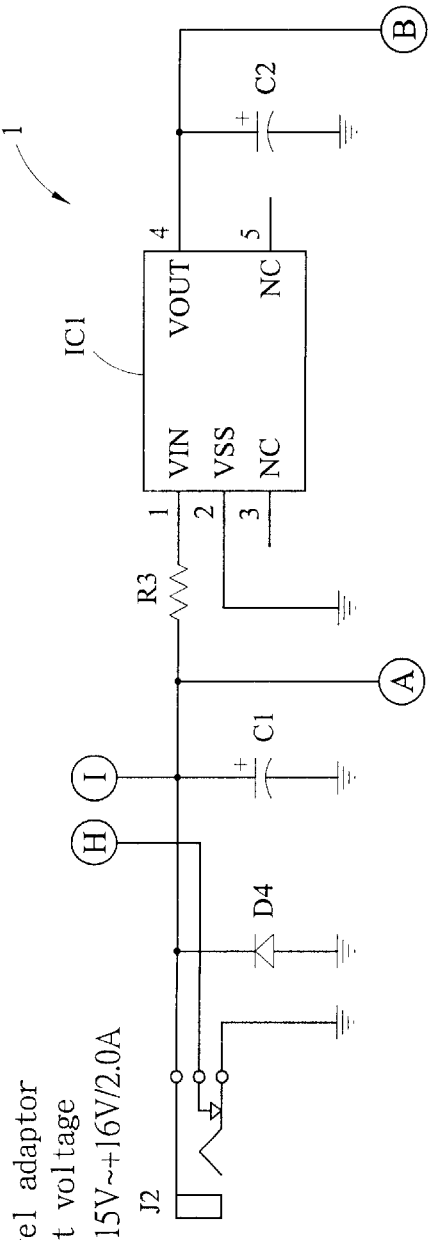
FIG. 2 is a circuit diagram of voltage stabilization unit of the FIG. 1 device.

Referring to FIG. 2, there is shown a detailed circuit diagram of voltage stabilization unit 1. As shown, input terminal J2 is coupled to an output terminal of travel adaptor having a DC voltage ranged from about +15V to +16V. Voltage stabilization unit 1 comprises a diode D4, filter capacitors C1, C2, a resistor R3, and a voltage stabilization integrated circuit (IC) device IC1. In case that a reverse voltage is inputted into the device the diode D4 is conducted to divert the reverse voltage to ground for protection of voltage stabilization IC device IC1. Capacitors C1, C2 and resistor R3 act to lower voltage for driving voltage stabilization IC device IC1. Fourth pin ($V_{out}$) is coupled to filter capacitor C2 for outputting a fixed DC voltage to charging unit 2.

Figure 3:
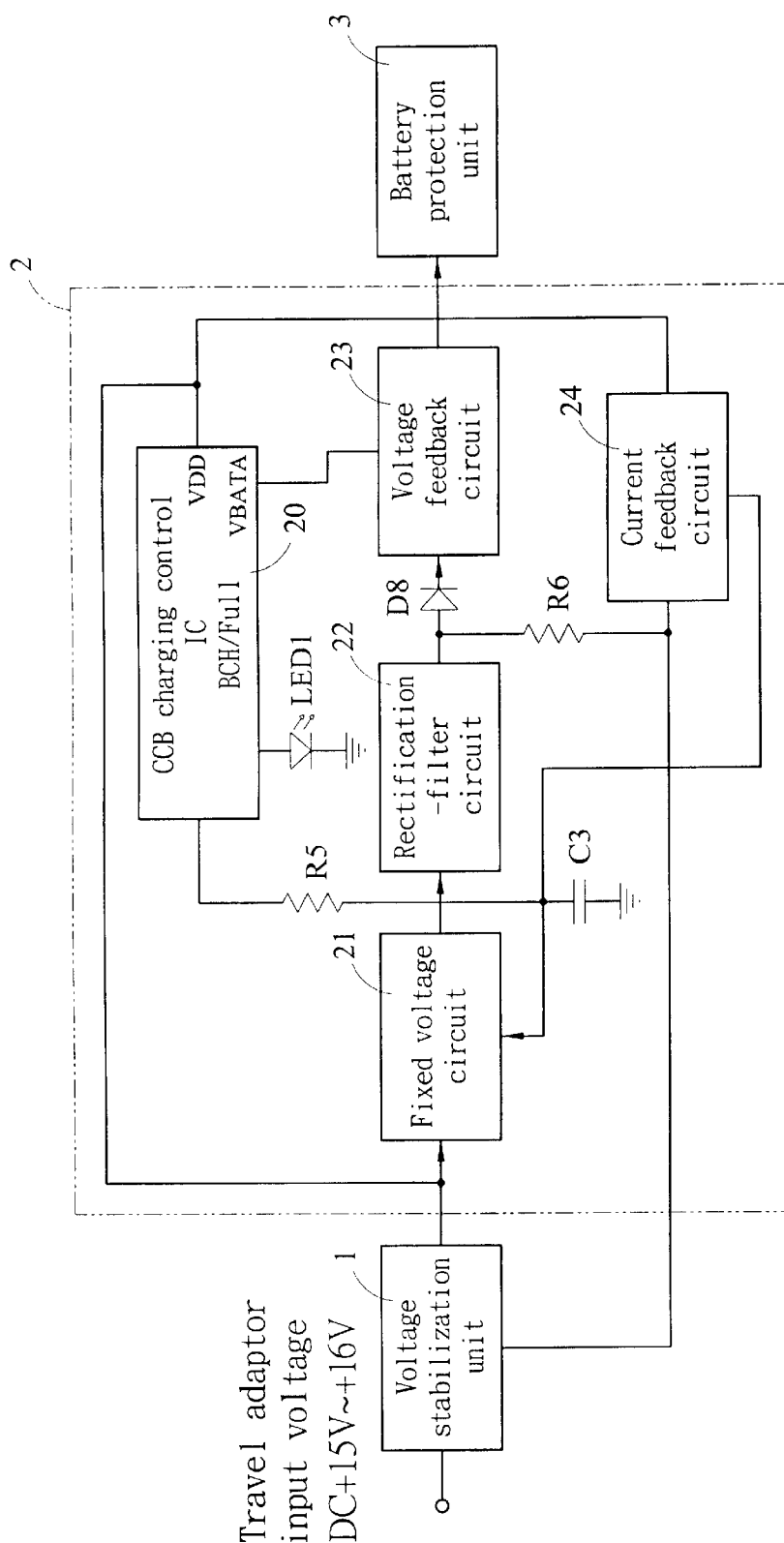
FIG. 3 is a block diagram of charging unit of the FIG. 1 device.
Figure 4:
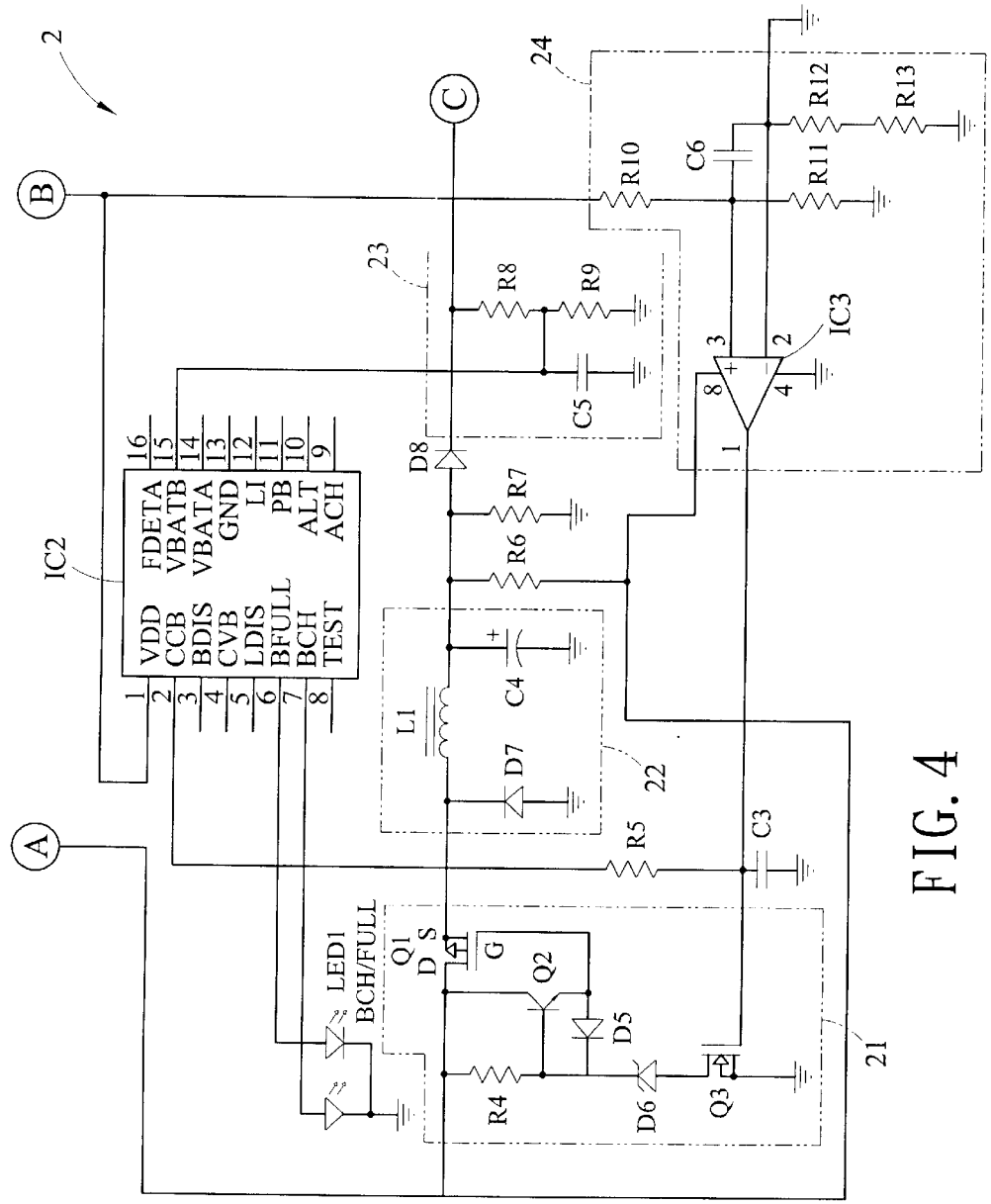
FIG. 4 is a circuit diagram of charging unit of FIG. 3.

Referring to FIGS. 3 and 4, charging unit 2 comprises a charging control IC 20, a fixed voltage circuit 21, a rectification-filter circuit 22, a voltage feedback circuit 23, and a current feedback circuit 24. Charging control IC 20 comprises a first pin (VDD) coupled to output of voltage stabilization unit 1, a second pin (CCB) in series with a resistor R5, a capacitor C3 and an output terminals of current feedback circuit 24 for detecting and thus controlling a charging of battery, and sixth and seventh pins both coupled to LED1 which is activated to emit different colors during charging. For example, a red light is emitted from LED1 in charging while a green light is emitted from LED1 after being completely charged. This facilitates visual identification. Fixed voltage circuit 21 comprises metal-oxide-semiconductor field-effect transistors (MOSFET) Q1, Q3, a transistor Q2, a resistor R4, a diode D5, and a Zener diode D6. Fixed voltage circuit 21 acts to activate battery protection unit 3. Both drain D of transistor Q1 and resistor R4 are coupled to capacitor C1 of voltage stabilization unit 1 for receiving positive DC voltage therefrom. Transistor Q3 is conducted when current feedback circuit 24 is in high voltage level (i.e., charging or discharging). In response, Zener diode D6, transistor Q1, and transistor Q2 are conducted. As a result, rectification-filter circuit 22 and voltage feedback circuit 23 are enabled to activate battery protection unit 3. In another case that transistor Q3 is cut off when current feedback circuit 24 is in low voltage level. In response, Zener diode D6, transistor Q1, and transistor Q2 are cut off. As a result, rectification-filter circuit 22 and voltage feedback circuit 23 are disabled to deactivate battery protection unit 3. Rectification-filter circuit 22 comprises a diode D7, an inductor L1, and a capacitor C4 coupled to output of fixed voltage circuit 21 (i.e., source of MOSFET transistor Q1) for stabilizing output voltage. Voltage feedback circuit 23 comprises resistors R8, R9 and a capacitor C5. Voltage feedback circuit 23 is coupled to fifteen pin (VBATB) of charging control IC 20 for charging battery protection unit 3. A diode D8 is coupled between output of rectification-filter circuit 22 and input of voltage feedback circuit 23 for inhibiting a reverse voltage input for protection of the device. Current feedback circuit 24 comprises a comparator IC3, resistors R10, R11, R12, and R13, and a capacitor C6. Comparator IC3 comprises a third pin (positive end) coupled to output (positive electrode of capacitor C2) of voltage stabilization unit 1, an eighth pin thereof coupled to both positive electrode of capacitor C1 of voltage stabilization unit 1 and resistor R6 connected to output of rectification-filter circuit 22, a first pin (output) coupled to capacitor C3 connected to resistor R5 and transistor Q3 respectively, and a second pin (negative end) coupled to negative electrode of battery for sensing a voltage thereof for comparison. First pin of comparator IC3 is high when third pin of comparator IC3 has a voltage level higher than that of second pin (negative end). As an end, transistors Q3, Q2 and Q1 are conducted for enabling battery protection unit 3 to charge the battery. To the contrary, first pin of comparator IC3 is low when third pin of comparator IC3 has a voltage level lower than that of second pin (negative end), i.e., charging completed. As an end, transistor Q3 is cut off and thus stopping charging the battery.

Referring to FIG. 5 specifically, battery protection unit 3 comprises an IC device IC7, a transistor Q15, thyristors Q16, Q17, resistors R32 to R41, and capacitors C16 to C22. First pin of IC device IC7 is coupled to collector of transistor Q15 and thyristor Q16 respectively. In a non-charging state, transistor Q15 and thyristor Q16 are conducted since first pin of IC device IC7 is in a high voltage level. To the contrary in case of overcharging, transistor Q15 and thyristor Q16 are cut off since first pin of IC device IC7 is in a low voltage level. This can automatically stop charging the battery. In case that a battery is consumed, fifth pin of IC device IC7 is in a high voltage level, thus cutting off thyristor Q17. This can prevent the consumed battery from continuing to discharge. The functions of IC device IC7 pins are detailed as follows: First pin (OV): It cuts off output if an over-voltage is detected. It is high in a non-charging state, or alternatively in a low voltage level in a charging state so as to control a conduction or cutting off of transistors Q15, Q16. Third pin (CS): It is an overcharging detection pin. Fifth pin (DCHG): It is a discharging control for controlling a conduction or cutting off of thyristor Q17. It is low in a non-charging state, or alternatively high in an over-discharging state. Seventh pin (CDC): It is an over-voltage discharging detection delay time setting pin. Eighth pin (COL): It is an over-current detection delay time setting pin. Ninth pin (COV): It is an over-voltage charging detection delay time setting pin. Eleventh pin (SEL): It serves to set the number of battery to be charged at one time. Pins 15 to 18 (V1 to V4): They are series batteries voltage detection inputs for determining whether there is an over-charging or over-discharging.

Figure 6B:
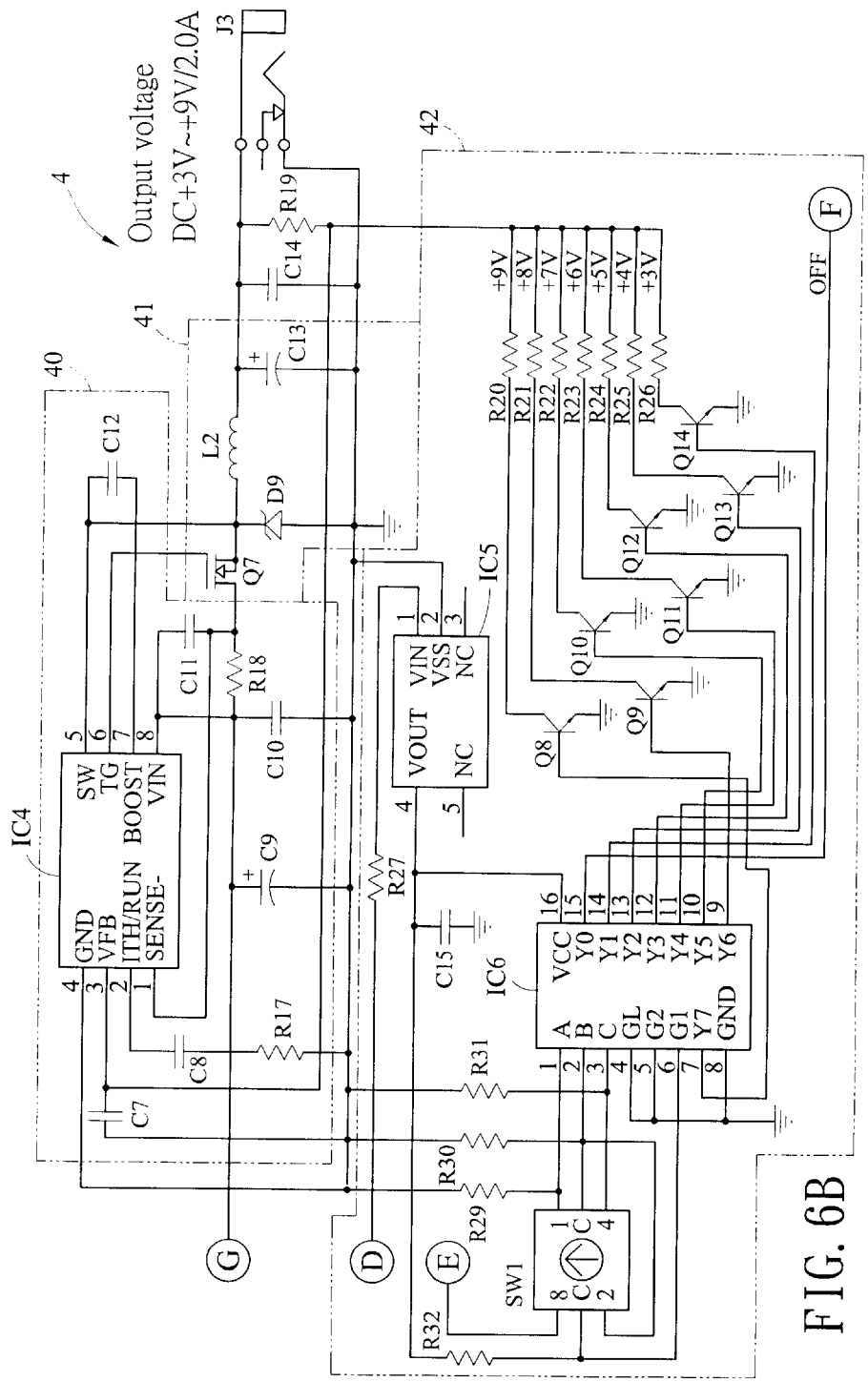
FIG. 6B is a circuit diagram of voltage setting unit of FIG. 1 device.

Referring to FIG. 6B, voltage setting unit 4 comprises a control circuit 40, a voltage adjustment circuit 41, and a voltage selection circuit 42. The control circuit 40 comprises a charging control IC device IC4, resistors R17, R18, and capacitors C7 to C12. Voltage adjustment circuit 41 comprises a MOSFET transistor Q7, a Zener diode D9, an inductor L2, a capacitor C13, and an output voltage terminal J3 coupled to capacitor C14. Voltage selection circuit 42 comprises a switch SW1, resistors R29 to R32, a capacitor C15, a stabilization IC device IC5, a decoder IC6, a resistor R19, and a switching control assembly including transistors Q8 to Q14 and resistors R20 to R26.

The functions of IC device IC4 pins are detailed as follows: First pin (SENSE): It is an over-current detection input pin. Transistor Q3 is cut off when voltage of resistor R18 is higher than a predetermined voltage value. Second pin (ITH/RUN): It serves to activate a loop setting. Third pin (VFB): It is an output voltage feedback control pin for selecting one of a plurality of combinations of resistors R19 and R20 to R26. Fifth pin (SW): It is an internal MOSFET transistor pin. Sixth pin (TG): It is signal trigger control pin. Seventh pin (BOOST): It is coupled to fifth pin via capacitor C12 for controlling the rise of voltage. Eighth pin (VIN): It is an operating current input of IC device IC4. When first pin of IC device IC4 of control circuit 40 detects voltage of resistor R18 higher than a predetermined voltage value, a signal is outputted from sixth pin to cut off MOSFET transistor Q17 of voltage adjustment circuit 41. Third pin of IC device IC4 is coupled to a selectable one of a plurality of combinations of resistors R19 and R20 to R26 for controlling a value of output voltage. Transistor Q7, Zener diode D9, inductor L2, and capacitor C13 of voltage adjustment circuit 41 are coupled to fifth, sixth, and eighth pins of IC device IC4 for adjusting an output voltage to the predetermined value. Thus, user can operate switch SW1 of voltage selection circuit 42 to select a desired voltage. The selected.voltage is in turn decoded by decoder IC6 so as to conduct one of transistors. Q8 to Q14. As an end, the selected voltage is outputted. Voltage setting unit 4 acts to adjust an output voltage of battery protection unit 3 to a value ranged from 3 to 9 volts. Likewise, user can operate switch SW1 to select a desired voltage. The selected voltage is in turn decoded by decoder IC6 so as to conduct one of transistors Q8 to Q14. As an end, the selected voltage value is outputted.

Referring to FIG. 6A in conjunction with FIG. 1, voltage stabilization and protection circuit 5 of another preferred embodiment of the invention may be coupled to an automobile power supply of DC 12V through input terminal J1. As such, the charging device may be charged by automobile power supply for convenience. As shown in FIG. 6A, voltage stabilization and protection circuit 5 comprises resistors R1, R2, and R14 to R16, a current limiting diode D1, transistors Q4, Q5, a thyristor Q6, and diodes D2, D10. Resistors R1, R2 and diode D2 serve to lower voltage of automobile power supply. Next, current limiting diode D1 rectifies the lowered voltage to output a fixed voltage for protecting components of the device and conducting thyristor Q6. Also, a voltage is applied to eight pin of IC device IC4 for conducting transistors Q4, Q5 so as to charge the battery coupled to emitters of transistors Q4, Q5. Upon completion of charging, the high voltage level of the battery will conduct diode D10, thus cutting off diode D2 so as to protect components of the device and prevent a reverse voltage from applying into the automobile power supply.

Note that a selected one of a plurality of voltages of the charging device may be outputted to one of a variety of portable electronic devices from voltage selection circuit 42 by connecting input terminal J3 (FIG. 6B) to a charging socket of one of the portable electronic devices to facilitate usefulness and convenience of the present invention.

In brief, the benefits of this invention include adaptability by possessing only one charging device, convenience, space saving, high efficiency, and being connectable to either external power source or automobile power supply depending on applications.

While the invention herein disclosed has been described by means of specific embodiments, numerous modifications and variations could be made thereto by those skilled in the art without departing from the scope and spirit of the invention set forth in the claims.

What is claimed is:

1. A charging device comprising:
   a) a voltage stabilization unit for receiving a rectified direct current voltage from an output adapter and maintaining a stable voltage output;
   b) a charging unit connected to an output of the voltage stabilization unit, the charging unit detecting a charge level of a rechargeable battery being charged and controlling when the charging device is turned on and turned off;
   c) a battery protection unit connected to an output of the charging unit and the battery being charged, the battery protection unit controlling the charging unit such that the charging unit is turned off when the battery is over charged or over discharging; and
   d) a voltage setting unit having a switch and being connected to an output of the battery protection unit, the switch selectively controlling the output voltage of the battery protection unit.

2. The charging device according to claim 1, wherein the charging unit comprises:
   a) a charging control integrated circuit;
   b) an LED device connected to the charging control integrated circuit and emitting different colors to display a status of the battery being charged;
   c) a fixed voltage circuit connected to the output of the voltage stabilization unit and the charging control integrated circuit, the fixed voltage circuit controlling when the charging device is on and off;
   d) a rectification-filter circuit connected to an output of the fixed voltage circuit for rectifying and filtering an output voltage of the charging unit;
   e) a diode connected to an output of the rectification-filter circuit as a protection device for inhibiting a reverse voltage input;
   f) a voltage feedback circuit connected to the charging control integrated circuit, the output of the voltage stabilization unit, and the battery protection unit such that the battery protection unit is enabled; and
   g) a current feedback circuit connected to the output of the adaptor, the output of the voltage stabilization unit, the output of the rectification-filter circuit, the charging control integrated circuit, and the battery for controlling the charging and discharging of the battery.

3. The charging device according to claim 1, wherein the voltage setting unit comprises:
   a) a control circuit connected to the output of the battery protection unit for controlling an output voltage thereof, the output voltage being between 3 DC volts and 9 DC volts;
   b) a voltage adjustment circuit connected to the control circuit for adjusting the output voltage to one of a plurality of preselected output voltages; and
   c) a voltage selection circuit including the switch, a decoder for decoding a setting mode of the switch, and a switching control assembly, the voltage selection circuit being connected to the control circuit for setting a selected output voltage from the plurality of preselected output voltages.

4. The charging device according to claim 3, wherein the switching control assembly has a plurality of transistors and resistors connected to the plurality of transistors, the transistors being controlled by the decoder such that one of the plurality of transistors will output the selected output voltage.

5. The charging device according to claim 3, wherein the output voltage selected from the plurality of preselected output voltages is output by the voltage selection circuit to an electronic device.

6. The charging device according to claim 1, further comprising a voltage stabilization and protection circuit connected between an input of the battery protection unit and an output of an automobile power supply.

* * * * *